Nov. 10, 1964   L. E. MILLER, JR   3,156,221
TWIN COMBUSTION CHAMBER SPHERICAL ENGINE
Filed March 30, 1961   7 Sheets-Sheet 1

FIG. 1

INVENTOR.
LLOYD E. MILLER, JR.
BY
Julian C. Renfro
ATTORNEY

Nov. 10, 1964 L. E. MILLER, JR 3,156,221
TWIN COMBUSTION CHAMBER SPHERICAL ENGINE
Filed March 30, 1961 7 Sheets-Sheet 3

Fig-3

INVENTOR
LLOYD E. MILLER, JR.
BY Julian C. Renfro
ATTORNEY

INVENTOR.
LLOYD E. MILLER, JR.
BY Julian C. Renfro
ATTORNEY.

United States Patent Office

3,156,221
Patented Nov. 10, 1964

3,156,221
TWIN COMBUSTION CHAMBER SPHERICAL ENGINE
Lloyd E. Miller, Jr., Sunrise Cedars, Md.
(7811 Erwin Road, Coral Gables, Fla.)
Filed Mar. 30, 1961, Ser. No. 99,546
24 Claims. (Cl. 123—8)

This invention relates to a novel spherical rotary internal combustion engine, and more particularly to a highly improved twin combustion chamber configuration that can be used as a fluid motor, compressor or the like, having high speed, high efficiency capabilities as well as a large displacement.

In my copending application entitled "Rotary Internal Combustion Engine," filed August 22, 1960, Serial Number 51,098, I disclosed and claimed a rotary engine having no oscillating nor reciprocating parts and possessing high speed, high efficiency capabilities. Though that engine has superior lubrication and cooling characteristics, it is possible, as will be hereinafter set forth, to construct the engine in another form having a higher power-to-weight ratio obtained through an increased displacement.

A device according to this invention, as in the previous case, may comprise a housing in which a generally spherical cavity is defined, with a relatedly movable nutator and rotor being rotatively disposed in this cavity. According to design principles, the rotor is disposed on a rotor shaft at an angle in the housing, which angle is the same as the angle of nutation of the nutator, thus enabling the rotor and nutator to rotate cooperatively in the housing to bring about volumetric changes. However, the present invention differs from my earlier one by providing the rotatable and relatedly movable rotor and nutator each with a pair of working surfaces thereon, with opposed working surfaces of rotor and nutator defining with an internal spherical portion of the housing a pair of chambers whose volumes change substantially and in opposite phase, this volume change being due to the working surfaces of the nutator alternately moving toward and away from the respective working surfaces of the rotor.

Engines utilizing these physical characteristics may have scavenging means including means for sequentially admitting scavenging air and fuel into the combustion chambers, to be combusted therein. The air is first compressed, and subsequent to the addition of fuel is combusted to drive the working surfaces of the nutator away from the corresponding working surfaces of the rotor. A preferred embodiment utilizes a crankshaft upon the crankpin of which the nutator is mounted, the crankpin having an angularity with respect to the main axis of the crankshaft. This angularity causes a nutating type of rotary motion that results in the generation of a hyperboloid, or double cone with apices touching. The rotor in each instance must have a shaft whose axis of rotation bears the same angle to the main axis of the crankshaft as does the crankpin. However, according to another embodiment of my invention, the crankshaft arrangement may be entirely eliminated and replaced by a non-rotating arrangement, in which event the rotor shaft rather than the crankshaft supplies useful rotative power.

Engines according to these embodiments have large displacement for their size, yet may be constructed at low cost. A wide range of utilizations is possible, such as for small engine applications as well as in compound engine arrangements in which the output shafts of several basic engine units may be coupled to a common output shaft.

Other objects, features and advantages will be apparent from the enclosed drawings in which.

Figure 1:
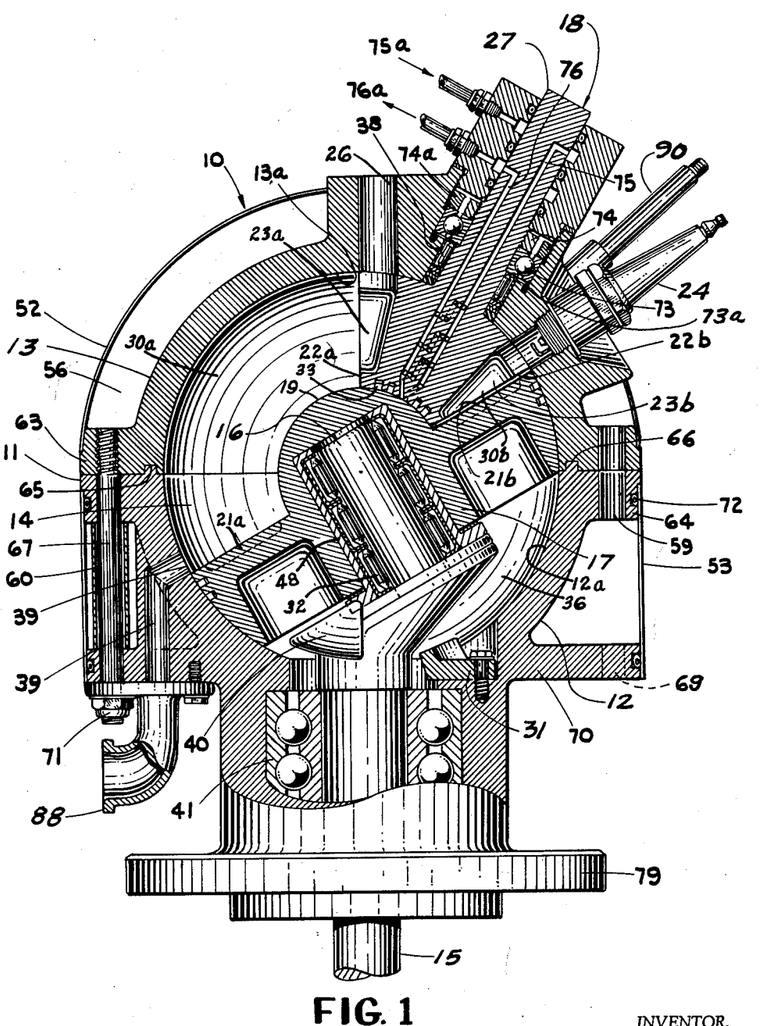
FIGURE 1 is a sectionalized side elevational view of a twin combustion chamber spherical engine according to my invention, with certain vital aspects of rotor and nutator set forth in detail.

Referring to FIGURE 1, the basic engine arrangement 10 there illustrated comprises a spherical housing 11 constituted by lower housing member 12 and an upper housing member 13 tightly secured thereto, such as by bolts. These members may be made of steel and generally in the shape of hemispheres, with their inside walls 12a and 13a being internally configured so as together to form a spherical cavity 14. The inside (or cavity) walls 12a and 13a are preferably hardened or hard-chrome plated to reduce wear. Crankshaft 15, preferably of steel, is rotatably mounted in lower housing member 12, such as being disposed in a double row ball bearing 41, and as noted in FIGURES 1, 2, and 3, an integral crankpin 16 is disposed upon the crankshaft at an acute angle with respect to the axis of the main portion of the crankshaft extending through bearing 41.

Figures 2, 2A:
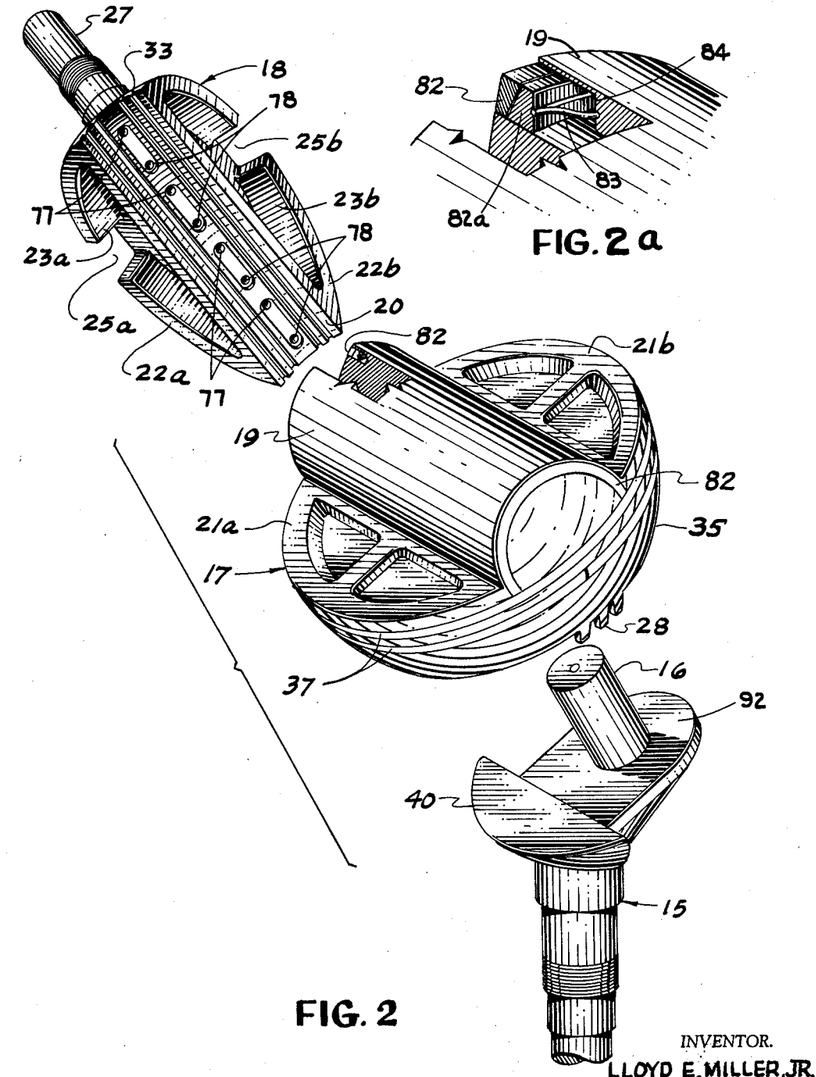
FIGURE 2 is an exploded view revealing the principal moving parts of the engine which comprise rotor, nutator and crankshaft, with the rotor axis tilted to reveal the bilateral symmetry of the rotor.
FIGURE 2a is a sectional view, to a considerably larger scale, revealing details of the sealing arrangement for the ends of the center bar.

Nutator 17 is rotatably disposed upon crankpin 16 and as illustrated in FIGURE 2, the nutator may be in the configuration of a symmetrical hemispherical frustum disposed in cavity 14 so that the nutator skirt 35 is for a full 360° extent in sliding yet gas-tight contact with the spherical cavity walls of the housing 11 at all times. Bearings, such as needle bearings 32 contained on the underside of the central portion of the nutator are responsible for providing a frictionless contact with the crankpin 16 so that the nutator can rotate and simultaneously nutate in the housing. This motion is made possible by the fact that as the crankshaft rotates, the crankpin axis is constantly nutating within the housing, thus causing the nutator axis to similarly nutate in the housing, while at the same time the cooperative relationship between the crankshaft, nutator and rotor maintains the rotation of the nutator, as will be explained in greater detail hereinafter. The crankpin is hardened to prevent damage from the needle bearings 32, and if desired a needle bearing sleeve 48 may be utilized in the nutator to allow easy removal of the needle bearings from the nutator.

Rotor 18, whose geometric form is essentially that of a spherical wedge, is rotatably mounted in substantially the opposite end of the housing 11 from the crankshaft 15, but is equipped with a rotor shaft 27 disposed at an obtuse angle to the main axis of the crankshaft, as illustrated in FIGURE 1. If the crankshaft axis is considered as extending upwardly through the upper housing member, the rotor axis may then be regarded as being at an acute angle thereto. There is a definite relationship between crankpin angularity and the rotor axis angle, for as will be noted from FIGURE 3, there is, and must be, a precise alignment between these two at a certain rotative position of the crankshaft. The crankpin and rotor axes may, for example, be disposed at a 30° angle to the extended axis of the crankshaft although this angle is merely cited as exemplary, and I am not to be limited thereto.

Unlike the combined nutating and rotating motion of the nutator, the rotor 18 undertakes only rotary motion in the housing, and its upper surface is configured to fit closely in sliding yet gas-tight contact with the upper portion of the cavity wall. Needle bearings 38 form an effective means for resolving the radial loading of rotor shaft 27, whereas the combination radial and thrust bearing 73 assures that the spherical surface of the rotor stays in desirable close contact with the cavity wall to prevent the leakage of gas between the combustion chambers. Nut 74 threaded upon shaft 27 locks the inner race of bearing 73 to this shaft by virtue of the inner race bottoming against a shoulder on shaft 27, whereas nut 74a threaded in the housing axially adjusts the outer race of the bearing to provide an optimum contact pressure between the spherical surface of the rotor and the housing wall so as to reduce friction. A spring washer 73a acting against the underside of the outer race of the bearing axially loads the said outer race against the adjustment nut 74a to remove axial play in the rotor and rotor shaft, these details being seen in FIGURE 1.

The motion of the rotor is always coincident with the motion of the nutator by virtue of an interconnection between these members in the form of a center bar 19, preferably of cylindrical shape as will be noted from FIGURE 2. This interconnection may be likened unto a hinge which permits in one part of the cycle, one face of the nutator to approach its respective face of the rotor as the opposite nutator face recedes, while rotationally 180° away from this position the one nutator face recedes as the opposite nutator face now approaches its respective face of the rotor. As seen in FIGURE 1, nutator face 21b has fully approached rotor face 22b and nutator face 21a has fully receded from rotor face 22a, whereas 180° away from the illustrated position the nutator face 21a will be closely adjacent the rotor face 22a as a result of crankshaft rotation. The center bar, which may if desired be barrel-shaped, spool-shaped or any other satisfactory configuration than the cylindrical shape illustrated, may be an integral part of the nutator as revealed in FIGURES 1 and 2, or alternatively may be a part of the rotor. In any event a close fit is afforded between center bar and the other rotative member, which in FIGURE 1 is of course the rotor. However, in order to reduce gas leakage from chamber 30b to 30a and vice versa, a plurality of seals 33 may be disposed upon the concave surface 20 of the rotor as will be noted in FIGURES 1 and 2.

The nutator may be made of aluminum alloy, as previously mentioned, and the rotor may be made of cast iron although a number of other suitable materials may be substituted if desired. Because of the substantial amount of contact pressure between the center bar and the concave surface opposite it, the center bar should for example be made of hardened steel or cast iron, or alternatively of mild steel or aluminum that has been hard-chrome plated, this latter being done to prevent seizure tendency and to reduce wear.

Nutator balance requires that for vibration-free operation of the nutator, the three principal moments of inertia $I_{xx}$, $I_{yy}$, $I_{zz}$ of the nutator must be equal. This is equivalent to letting the nutator have approximately the mass distribution of a solid sphere, and such is accomplished in design by placing high density mass such as inert uranium or tungsten alloy at calculated points within the nutator and center bar envelope. Unlike the nutator configuration revealed in my earlier-filed copending application, the nutator of this engine is fully skirted, that is, has a skirt that is in 360° contact with the spherical housing walls, and fully circular rings 37 in the nature of piston rings which afford gas-tight yet uniform contact pressure against the inner sidewalls of the engine. Expander springs (not shown) may be used to assure that the rings 37 bear tightly against the sidewalls.

Correspondingly, the rotor, which undergoes only rotative motion, requires only simply static and dynamic balance as compared to the nutator, this being augmented by the symmetrical design. The crankshaft 15 may be balanced by the use of a crank-balance 40 which offsets the weight of the crankpin 16 and its associated crank arm.

Lubrication of mating surfaces of rotor and nutator is provided by a forced feed lubrication system involving longitudinal passages 75 and 76 in the rotor shaft, through which oil may flow, the incoming oil being supplied to passage 75 from supply pipe 75a, with the return oil flowing upward along passage 76 leaving through outlet tube 76a. The inlet passage supplies oil to alternate holes 77 located on the underside of the rotor as revealed in FIGURE 2, with the holes 78 intermediate these oil supply holes forming a return arrangement interconnected to return passage 76. A similar network of holes supplies oil to the spherical surface of the rotor via passage 75 with return oil being carried away by passage 76. This system has been found to be superior to a system utilizing no oil return, for in such instance the oil holes quickly fill with varnish and carbon. In contrast, the present circulating oil arrangement removes carbon and varnish before build-up takes place, as well as serving to cool the rotor by removing heat.

The combined rotational-nutational motion of the nutator in the cavity 14 effects a comparatively large swept volume, or in other words a substantial volumetric displacement. The combustion chambers 30a and 30b which are defined between faces 21a, 22a and faces 21b, 22b respectively, are in the shape of spherical wedges situated between these cooperating faces and the cavity sidewall that, during engine operation, are constantly changing in volume. Combustion chamber 30a is at its maximum volume in FIGURE 1 contemporaneous with combustion chamber 30b being at its minimum volume, and as should now be obvious, at a point of rotor travel 180° away from the illustrated position, combustion chamber 30a will be at its minimum volume and chamber 30b at its maximum volume.

The motion of the nutator with respect to the rotor may be considered as relative oscillating motion, but inasmuch as the rotor and nutator are not rigidly joined, but rather independently supported by bearings in the housing, there is no actual oscillating motion as such. It should be noted that as the crankshaft 15 rotates, the crankpin 16 is at all times perpendicular to working faces 21a and 21b of the nutator, or in other words, the axis of the crankpin is at all times during rotation coaxial with the principal axis of the nutator. The rotation of the crankshaft is such as to cause the nutator and rotor to rotate within the housing at a mean angular velocity of one-half crankshaft angular velocity.

To perhaps form a better visualization of the motion which takes place in my engine, consider the crankshaft and nutator relationship separate from the engine assembly. Consider first the nutator as a balanced wheel rotating freely on the stationary crankpin. No unbalanced forces whatever tend to cause vibration, and any friction in the needle bearings is the only retardant. Next, with the nutator spinning freely on the crankpin, allow the balanced crankshaft to rotate in its own bearings. A balanced rotating system operating on a balanced rotating system is now obtained. With these two simultaneous rotations taking place, one requirement is mandatory in order to have the combined system free of forces, and that is to adjust the three moments of inertia of the wheel (nutator) so that they are equal. This allows the wheel or nutator to have the mass distribution of a solid sphere. If $Ixx$, $Iyy$ and $Izz$ were not equal, there would exist a restoring force couple, produced by the nutator, acting by the needle bearings on the crankpin 16 which would tend to restore the $z$ of principal axis of the nutator parallel or coaxial with the axis of rotation of the main portion of the crankshaft.

This motion of the nutator is definitely not oscillatory nor does it possess any of the acceleratory or deceleratory forces associated with oscillating motion. It is, however, relative oscillating motion—relative to the rotor to which the nutator is not dependant in any way for the resolution of forces. This relative oscillating motion is thus advantageously employed in my engine to produce a volumetric displacement without any actual oscillating motion and the kinetic energy loss that is associated with it.

The volumetric displacement of my engine is quite large, much larger than that of the "universal joint" rotary engines of the early 1900's. The displacement of such earlier engines was a function of the angle between the two shaft axes, and the displacement angle between the working faces in such engines was twice the shaft angle. Thus, a 30° shaft angle yielded a 60° displacement, but this scarcely gave enough angle for porting a given chamber, much less having a volume left for compression. Although a 45° shaft angle yielded a 90° displacement, universal joints do not work well in this angular range because cross pin bearing loads and driven-member velocity variation become large.

My engine, by way of contrast, possesses a displacement angle four times the shaft angle, with a 30° shaft angle yielding a 120° displacement. Significantly it should be noted that small velocity variations are associated with such a small shaft angle, the order of magnitude being approximately 14% as compared with a 40% to 50% figure for universal joint engines and a 100% velocity variation in the pistons of a reciprocating engine.

The orientation of the nutator is both a function of the crank pin position and the position of the rotor. As previously discussed, rotation of the crankshaft causes a pair of working faces such as 21a and 22a to be brought from the expanded or widely separated position shown in FIGURE 1 into close relationship with greatly reduced volume therebetween, with resultant compression of any air trapped between these members. Therefore, if forced air as produced by a roots blower, centrifugal fan or the like is supplied through intake manifold 88 into the spherical cavity, it is then compressed between one or the other pairs of working faces into a small volume. If a charge of fuel is injected into this highly compressed air and such is ignited either by a spark plug or as a function of air temperature, the resultant combustion produces a substantial increase in chamber pressure which acts upon the pertinent working face of the nutator to impart power, resulting in rotation of the crankshaft. Rotationally 180° away, the other pair of working faces compress another charge of air to a small volume which is similarly utilized for the delivery of power.

Figure 4:
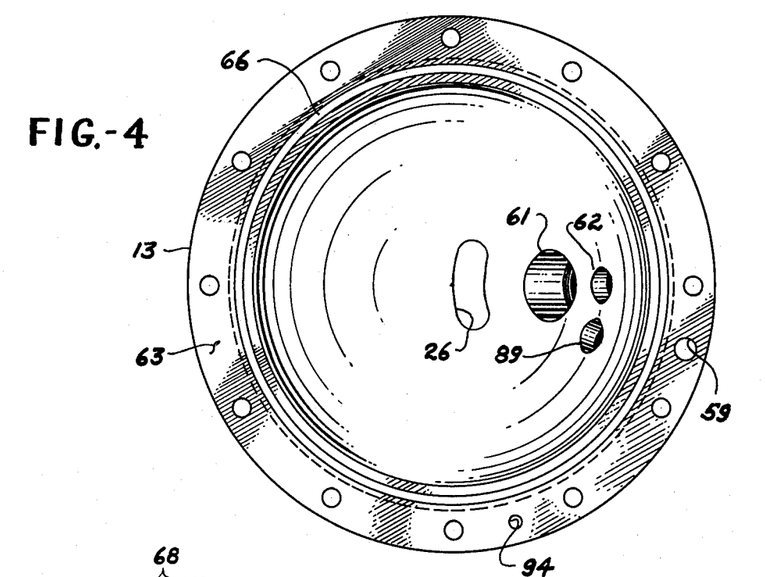
FIGURE 4 is a view of the inside of the upper housing member as viewed from the spherical center of the engine.
Figure 5:
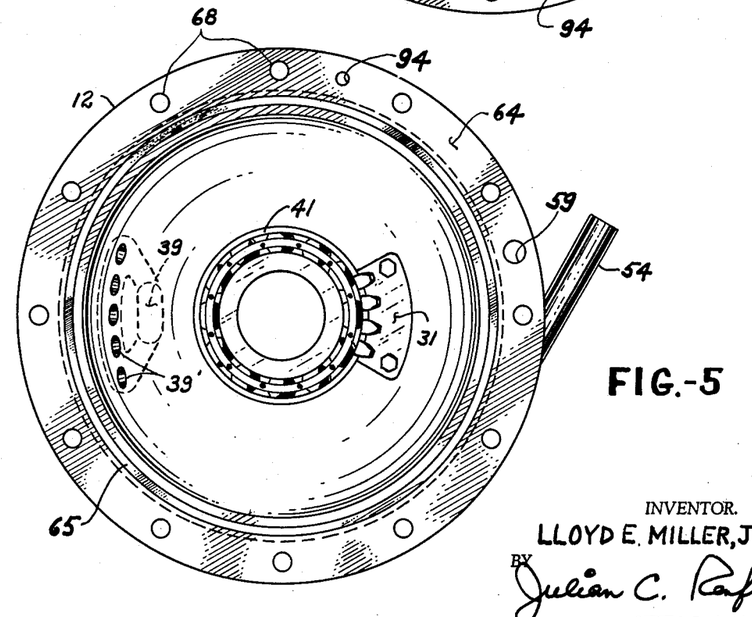
FIGURE 5 is a view of the inside of the lower housing member viewed similarly.

For the admission of air to the housing I preferably utilize a valveless arrangement in which a portion of the nutator skirt uncovers inlet port holes 39' disposed in the side wall of the lowering housing as revealed in FIGURE 5, air being supplied to holes 39' through inlet air passage 39 by intake manifold 88. A fuel injector 90 is provided on the upper housing member and is appropriately located and timed to inject an atomized spray of fuel into the compressed air at an appropriate portion of the cycle, this occurring slightly before the chamber defined by a pair of working faces attains its minimum volume. A spark plug 24 is located adjacent the fuel injector in the case of a gasoline engine, but this may be omitted or replaced by a glow plug in higher compression engine versions operating on the diesel cycle. In the case of a gasoline engine, the spark plug is so located as to fire into the highly compressed gases in the combustion chamber an instant after fuel injection so that an optimized combustion process can take place. It should be further noted that the tapped hole 62 for the spark plug and the fuel injector hole 89 of FIGURE 4 are equidistant from the rotor shaft in the upper housing member so as to successively coincide with passage 25a or 25b of the rotor at appropriate rotative positions of the rotor. These passages are common to the respective combustion pockets 23a and 23b located in the rotor, these pockets each being a part of the respective combustion chamber 30a or 30b. These pockets are not required, but are preferred since their volumes may be adjusted readily in design to effect the compression ratio of the engine, and it should be noted that these pockets could alternatively be recesses in the working faces of the nutator.

As to the exhausting of the products of combustion, an exhaust port 26 is provided in the upper housing at a location essentially opposite to the spark plug with regard to rotor shaft 27, so that during a certain period of rotation of the rotor, namely when the combustion chamber is at its largest volume, the relationship of passage 25a or 25b (as the case may be) with port 26 is such that the exhaust products can escape to the exhaust manifold, not shown, and subsequently the atmosphere. Port 26 is kidney-shaped to permit exhausting to occur during a predetermined angle of rotor rotation. A considerable amount of overlap is desirably present between the opening of the exhaust port 26 by the rotor and the opening of the inlet port holes 39' by the nutator so that a highly effective scavenging scheme can be utilized to sweep the combustion products from the housing before the next compression stroke is commenced.

Referring now to FIGURE 2a, pertinent details are there illustrated by means of which the ends of the center bar 19 are sealed with respect to the spherical housing sidewalls to prevent the undesired leakage of gas between combustion chambers. Semi-circular ring 82 fits into a semi-circular groove 84 located at each end of the center bar. It should be noted that this groove is located very close to the principal curved surface of the center bar, with only a thin wall thickness remaining. An expander spring 83 acts against an inner ring 82a which in turn biases the ring 82 into closely fitting relationship with the inner surface of the spherical housing wall. An angularity preferably exists between the outer face of the inner ring 82a and the inner face of the ring 82, this angularity causing the inner ring 82a to be biased in the groove toward the axis of the center bar contemporaneous with the outer ring being biased away from the center bar axis. This arrangement reduces leakage behind the ring because of the radial as well as longitudinal biasing.

The structure and structural relationships of the rotor and nutator offer an inherently simple valving and "straight" or uniflow scavenging arrangement utilizing no poppet valves or the like, this scavenging scheme being readily possible because of a port opening located at each end of the combustion chamber. The inlet port holes 39' are opened during the scavenging part of a combustion cycle by the skirt 35 of the nutator 17 as it passes through the position where a combustion chamber is of maximum volume. Note FIGURE 1, wherein this detail as well as the exhaust port 26 opened by the rotor passage is shown. As is the case in two-stroke reciprocating blower-scavenged engines, the exhaust port is here also arranged to be opened a few degrees ahead of the opening of the inlet holes to allow chamber pressure to fall below the delivery pressure of the blower.

Figure 3:
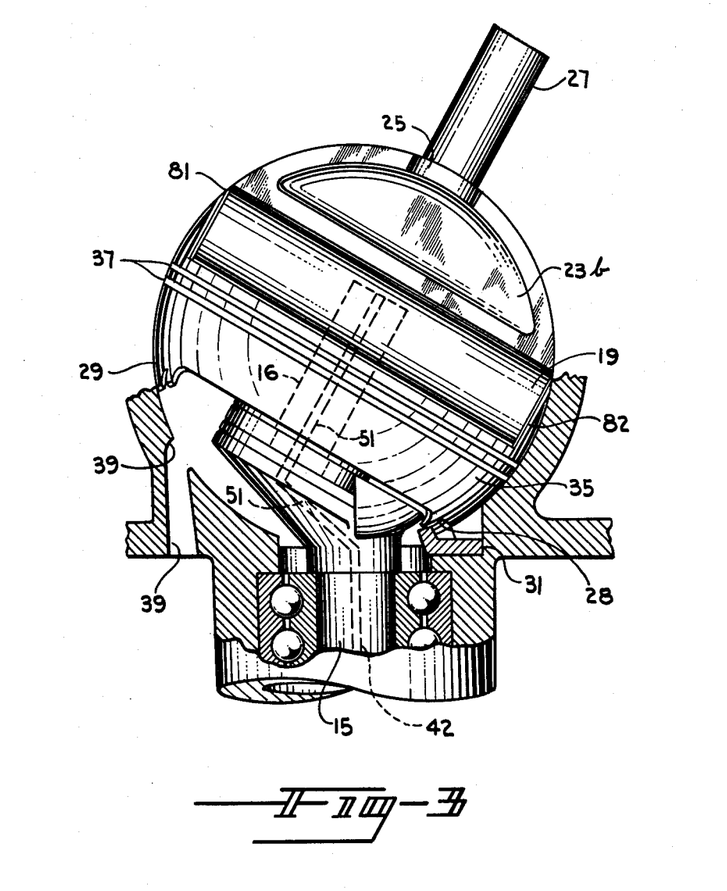
FIGURE 3 is a side elevational view illustrating alignment of crankpin and rotor axes, with nutator teeth shown engaging the restraining gear as well as other constructional details.

When the crankshaft has rotated so that the axis of the crankpin 16 is coaxial with the axis of the rotor shaft 27 as shown in FIGURE 3, both the rotor and nutator are, so to speak, unrestrained, i.e., rotation of the rotor and nutator about this axis does not produce a displacement between the working elements. Accordingly, I propose at least one system of restraint whereby the motions of the rotor and nutator can be controlled during this angular sector where no restraint is provided by the crankpin.

A preferred system for providing the required restraint utilizes several gear teeth milled or otherwise formed on opposite sides of the nutator skirt 35, or attached to the skirt at locations 180° apart in alignment with the axis of the center bar. Note nutator gear sector 28 shown in FIGURE 2 and nutator gear sector 29 shown in FIGURE 3. A fixed gear sector 31 having teeth of similar diametral pitch to gear sectors 28 and 29 is located in the lower housing as shown in FIGURES 1, 3, and 5 and is disposed with respect to the crankshaft so as to be engaged by the gear sectors 28 and 29 of the nutator during each complete rotation of rotor and nutator. Each sector of nutator teeth alternately mesh with the teeth of the fixed sector, thus providing controlled rotor-nutator motion during that part of the cycle where no restraint is provided by the crankpin. The gear sectors should be slightly elliptical to accommodate the small change in angular velocity which takes place. It should be noted that the teeth do not mesh with great impact because rotational restraint is still provided by the crankpin as the gear teeth begin to engage, and it is not until after the gear teeth subsequently disengage that the crankpin again assumes the responsibility for rotational restraint. Although I prefer to use a plurality of teeth for restraint, as illustrated, it is within the purview of this invention to use but a single upstanding tooth on the interior of the cavity, which meshes with a single tooth space on each side of the nutator skirt to provide restraint.

With the elements depicted in an exploded view as in FIGURE 2, the crankshaft 15 is disposed in the approximate position for bringing about either the position of the nutator shown in FIGURE 1, or the position 180° away therefrom, this change being brought about by a 360° turn of the crankshaft, thus illustrating the two-to-one speed relationship of crank to rotor-nutator. This figure also illustrates the crankshaft design, including the crank arm and the crank counterbalance 40, as well as the crankpin 16 and the nutator thrust member 92.

Referring to FIGURE 3, it will be seen that the housing has largely been removed to reveal the movement of rotor and nutator to a position approximately 90° away from the position shown in FIGURE 1, this being brought about by a 180° turn of the crankshaft, thus to dispose the crankpin 16 in approximate alignment with the rotor shaft 27. This combined rotation and nutation of the nutator results in the skirt portion 35 of the nutator being disposed in a position extending across the juncture of the upper and lower housings. When the crankpin and rotor shaft are in alignment as shown in this figure, the crankpin can no longer furnish the required restraint, as previously mentioned. The restraining gear therefore, functions to restrain the nutator during that portion of the rotation wherein no restraint is normally provided by the crankshaft, it being understood that when the crankshaft has rotated 360° so as to dispose the opposite gear teeth 29 of the nutator in engagement with the fixed gear teeth 31, the relationships of the principal elements shown in FIGURE 3 will be the same.

Crankshaft 15 is drilled for lubrication purposes to form a passage 42 for oil, and a fitting (not shown) on the lower housing is connected to an oil pump (not shown) which may be engine-driven or separately driven by another means. This passage 42 carries oil upwardly and connects with a passageway 51 drilled through the crank arm and crankpin in order to lubricate the needle bearings 32.

As to other constructional details of the housing, the upper housing member 13 is provided with an encircling flange 63 which interfits closely with flange 64 of lower housing 12. As seen in FIGURES 1, 4 and 5, one of the flanges, such as flange 64, is provided with an upstanding ring 65 whereas the opposite flange has a complementary groove 66 with which the ring interfits to provide the proper axial alignment between the housing halves. A series of bolts 67 or the like are disposed in spaced relation about the housing and which when tightened cause the flanges 63 and 64 to provide a high-pressure gas-tight seal between the housing halves. These bolts are, for example, threaded into tapped holes in flange 63 as will be noted in FIGURE 1, so as to in effect represent studs which extend through holes 68 in flange 64 when the housing halves are assembled together. These bolts or studs are of greater length than the flange thickness, however, and extend also through holes 69 located in lower flange member 70. These holes 69 are of course aligned with holes 68 of flange 64, and nuts 71 are employed on the threaded lower ends of the studs to draw the housing components tightly together. Hollow spacer members 60 extend between the flanges 64 and 70, through which members bolts 67 extend. These spacer members are in fluid-tight relation with flanges 64 and 70 to prevent leakage of coolant from within the cooling jackets hereinafter described, and also prevent distortion of the lower housing when the bolts extending between the flanges 64 and 70 are tightened.

The water jacket arrangement utilized to cool the housing is provided by an upper cooling jacket 52 of comparatively thin metal generally conforming to the hemispherical external contour of the upper housing, and a substantially cylindrically-shaped lower cooling jacket 53. The upper jacket is preferably welded to the upper housing and is in fluid-tight relation therewith, whereas the lower jacket may be removable, in which event O-rings 72 may be circumferentially disposed about the flanges 64 and 70 to provide proper sealing relation.

Water or other suitable coolant is admitted to the cooling jackets by means of a coolant inlet 54, which, as shown in FIGURE 5, is tangentially disposed upon the lower housing. The outlet (not shown) is disposed on the upper housing. A baffle arranged adjacent to the tangentially-disposed inlet pipe 54 blocks the encircling flow from making more than one revolution around the lower housing and then directs the water to flow upwardly through hole 59 in the flanges 63 and 64 and then enter the interior of the jacket 52 of the upper housing. The water is caused to flow in the opposite rotative direction within the water jacket of the upper housing because of another baffle arranged to cause the water to flow counter-clockwise. The flow of water is prevented by latter baffle from making more than one revolution, which further directs the water to flow toward the highest point on the upper housing, at which point the water outlet is located. Since the expansion portion of the engine cycle typically occurs on the near side of the upper housing for "standard rotation" (crankshaft rotation counter-clockwise as viewed from crankshaft end) the direction of engine rotation therefore dictates that the water outlet be located at this, the highest and hottest point in the engine.

In FIGURE 4 a view of a typical interior of an upper housing portion is illustrated in which the kidney shaped exhaust port 26, hole 61 for rotor shaft, a tapped hole 62 for spark plug 24, and tapped fuel injector hole 89 are shown. It will be recalled that the rotor shaft hole is spaced approximately equidistant between spark plug and exhaust port inasmuch as the passages 25a and 25b of rotor 18 must substantially coincide with the exhaust port during the exhaust function and with the spark plug during ignition. Oil return hole 94 shown in FIGURES 4 and 5 accommodates the return flow of lubricating oil from the rotor shaft bearings 73 and 38, the supply of oil to these bearings having been supplied by an oil supply line which connects to oil passage 75a. This return flow of oil is thereafter led through a tube (not shown) extending within the water jacket of both housings, and ultimately into an oil sump that may be formed to provide for the lubrication of bearing 41.

Engine mounting flange 79 is provided about the base of the engine according to FIGURE 1, about the circumference of which a number of mounting holes are located, which, for example, may be six in number.

Figure 6:
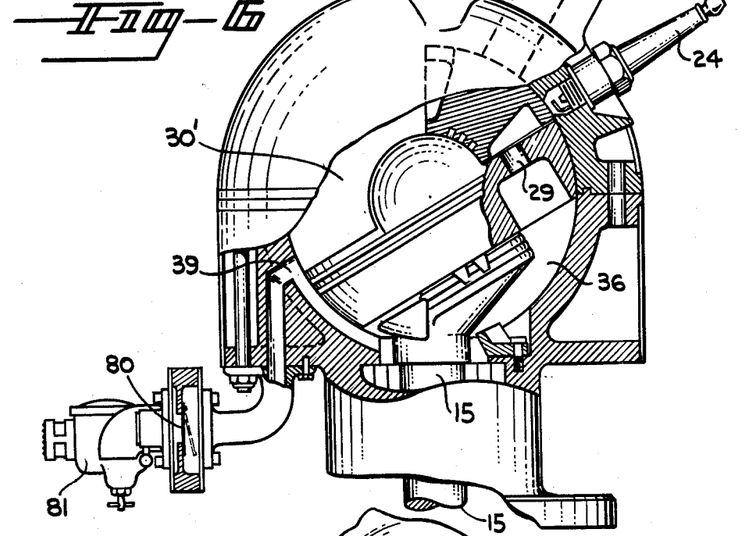
FIGURE 6 is a side elevational view of a self-scavenged engine embodiment according to this invention.

If desired, the self-scavenging principles taught in my aforementioned copending application may be employed herein. In such case, the nutator 17 instead of having combustion pockets formed in faces 21a and 21b as illustrated in FIGURE 2, may have one of these faces altered to the extent of having one or more suitable openings 29 therethrough as shown in FIGURE 6, thereby to establish communication with space 36 below the nutator. This space 36 is thus converted into a crankcase whose volume changes considerably with the movements of the nutator. By the use of appropriate valving and carburetion schemes, the engine can be operated without the need for either a blower or a fuel injection system, as will hereinafter be described.

The air inlet for the engine, instead of being connected as in FIGURE 1 to serve the combustion chambers 30a and 30b with air as permitted by nutator movements, may instead be connected to supply air to crankcase 36. A reed valve 80 is employed in the air inlet to prevent the reverse flow of air therethrough, and a carburetor 81 is employed to convert this incoming air into a combustible mixture such as can be combusted in the single combustion chamber of this embodiment.

As an example of the operation of the embodiment of FIGURE 6, as the nutator moves relatively upward to compress a charge of gas and air between the working faces of the nutator and rotor, the crankcase volume is contemporaneously increasing, causing ambient air to flow into the carburetor 81. The carburetor serves the function of mixing the proper proportion of fuel with the air, which mixture is then drawn through the reed valve 80 into the crankcase 36. By the time the nutator has rotated to such an extent as to reach its most upward point of travel and started downwardly, the reed valve has closed and the crankcase pressure is caused to increase, such as to a pressure of 4 or 5 p.s.i. As the nutator rotates still further, it uncovers an appropriately disposed inlet port 39, thus allowing the charge of combustible mixture pressurized in the crank case to flow into the combustion chamber 30', purging same and driving the spent exhaust gases upwardly and out through the now uncovered exhaust port 26. As the rotor and nutator rotate still further, the port 26 as well as the inlet are closed, thus trapping inside the combustion chamber a combustible mixture to be compressed by the next relatively upward movement of the nutator. The spark plug 24 is timed to ignite the mixture at the proper moment, with the resultant pressure increase acting as a force upon the nutator working face, driving it rotatively as well as relatively downward into the position in which it again uncovers the inlet to admit the next charge of fuel and air, at the same time causing useful power to be delivered to the crankshaft. A single lobe cam driven from the rotor shaft can supply correctly timed electrical impulses to the spark plug, whereas a double lobe cam is utilized for the dual combustion chamber embodiment previously described herein.

Figure 7A:
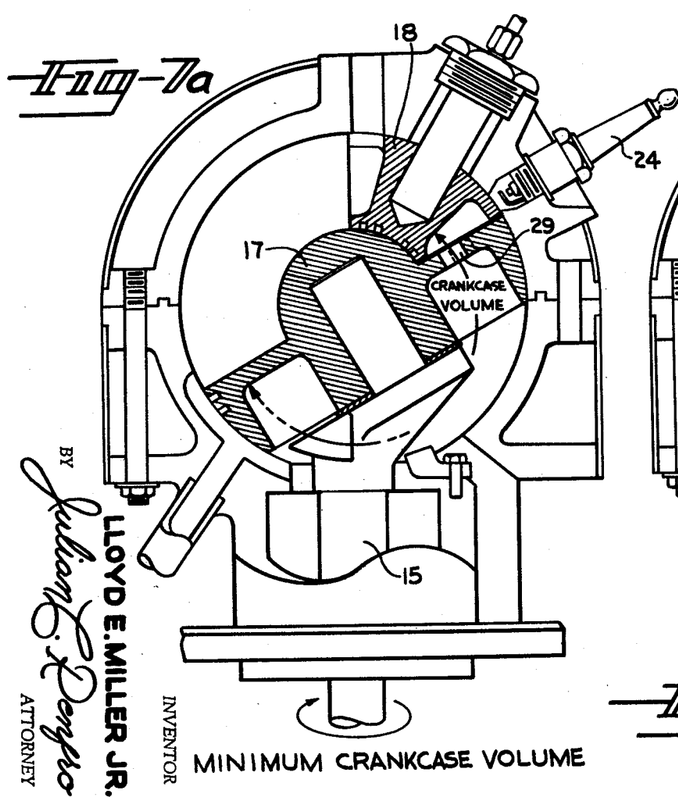
FIGURE 7a is a simplified view of the self-scavenged engine embodiment showing the relationships of rotor and nutator members during minimum crankcase volume.
Figure 7B:
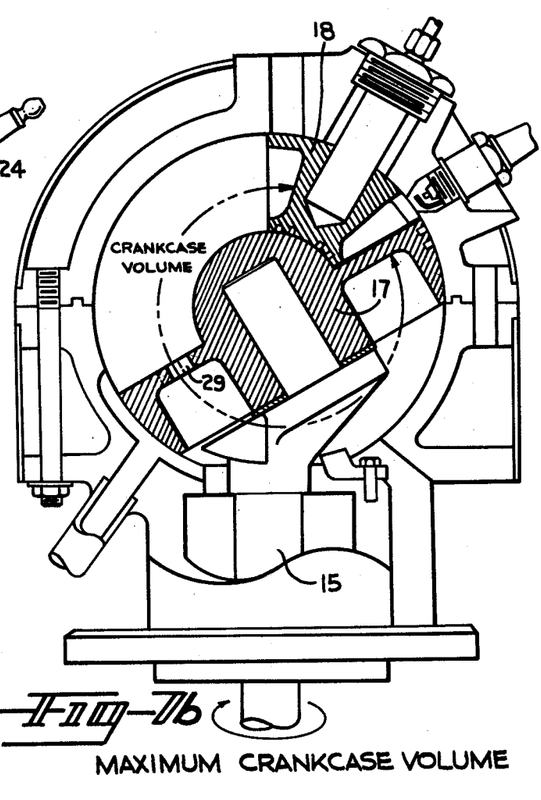
FIGURE 7b is similar to FIGURE 7a but reveals the principal engine members in the position of maximum crankcase volume.

By reference to related FIGURES 7a and 7b, the considerable variation in crankcase volume per crankshaft revolution will become quite apparent. This change in crankcase volume takes place by virtue of the fact that in FIGURE 7a, the nutator 17 is in the position in which the aperture or apertures 29 are immediately adjacent the rotor 18, hence defining a crankcase volume that extends only to the portion of the nutator remote from the rotor. However, as shown in FIGURE 7b, when the crankshaft 15 has rotated 360° so as to cause the nutator 17 to move to a position in which the apertures 29 are remote from the rotor 18, the crankcase volume then extends through a high percentage of the volume of the spherical cavity.

It should be noted that the engine embodiments employing two or more basic engine units according to this invention may utilize castings common to several units. For example, the lower housings of the units can be created in a common casting to constitute a V-configuration engine, whereas in in-line units, for example, the upper housings of the several basic engine units may be made from a common casting. For utilizations such as for outboard motors, where compactness is quite important, the use of common housings for the several basic engine units is particularly desirable.

Figure 8:
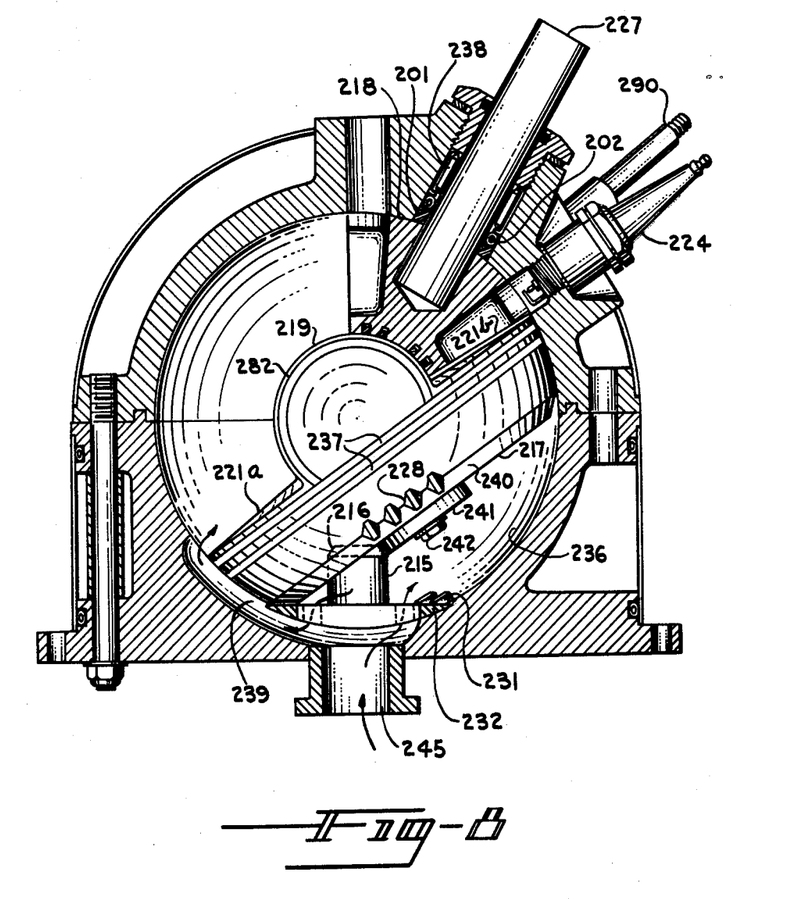
FIGURE 8 is an embodiment of this engine utilizing no crankshaft.

This invention is not limited to embodiments in which a crankshaft is employed, for as seen in FIGURE 8, an engine according to this invention can consist of but two moving parts, a rotor 218 and nutator 217. As in the previous embodiments, rotor 218 is rotatively disposed in the housing with its rotor shaft 227 disposed at an acute angle to the principal axis of the engine but the crankshaft has here been replaced by a central upstanding member 215 located on the principal axis of the engine in the lower central portion of the housing. Member 215 has a chamfered edge or track 216 disposed about its upper periphery, the member 215 according to the illustrated embodiment being such that a roller 241 on the underside of the nutator, described in more detail hereinafter, can roll about the track 216 during rotation of the nutator. Alternatively, the proper friction-free contact between member 215 and the nutator can be obtained by having the member 215 rotatably mounted in the housing.

A hardened chamfered edge or load bearing surface 240 is disposed about the periphery of nutator 217, which moves in rolling contact with a fixed circular track 232 of hardened metal disposed about and spaced from the fixed member 215. The roller 241 which may be in the nature of a ball bearing, is secured such as by a bolt 242 to the central portion of the underside of the nutator, and this roller is arranged to roll about the chamfered edge 216 on the member 215.

For the sake of simplicity of illustration, FIGURE 8 shows the nutator chamfered edge 240 and the outer track 232 to be of circular construction. Since the velocity variation of the nutator with respect to the housing would produce a slight shearing or sliding action between the two surfaces, a preferred arrangement, not shown, utilizes an elliptical surface 240 engaging with the fixed circular eccentric track 232 to provide only pure rolling contact between the said surfaces. An alternate embodiment employs a circular edge 240 engaging with a rotatably mounted track 232 to eliminate any shearing action arising from the velocity variation, thusly providing only rolling contact.

As a result of the governing action of the inner and outer tracks, the axis of the nutator is only permitted to generate a hyperboloid, i.e., a double cone with apices touching. This motion is identical to the motion allowed by the crankshaft.

The system of restraint used herein, employing gear sectors, is identical to the system of restraint used in the crankshaft embodiment. As seen in FIGURE 8, gear sector 228 is employed on one side of the nutator skirt opposite a gear sector, not shown, and these two sectors alternately mesh with fixed gear sector 231 during engine operation. Since no crankshaft is utilized in this embodiment, the force applied to the working faces 221a and 221b of the nutator cause the nutator to experience the combined rotational as well as nutational type of movement as in the crankshaft type engine. The resultant torque on the nutator is transmitted to the rotor through the center bar hinge 219 and thus to the rotor shaft 227 where power is taken off.

As should be apparent, incoming air entering inlet 245 flows into crankcase 236, and thence through bypass 239 into the combustion chamber portion of the engine when the nutator has moved to the position shown in FIGURE 8. This embodiment can be operated either as a twin combustion chamber engine as described with regard to FIGURE 1, or alternatively operated as a single combustion chamber self-scavenged engine.

As also seen in FIGURE 8, a seal 201 such as of Teflon surrounding the rotor shaft 227 in contact with both the housing wall and spherical rotor surface prevents high temperature combustion gas from leaking into the needle bearings 133. An O-ring 202 of neoprene between the Teflon seal and the needle bearings prevents pressurized oil supplied by an oil fitting from being lost uncontrollably into the combustion chamber, although an anticipated amount of leakage through the two seals provides lubrication for the spherical surface of the rotor.

Although I have shown the parting plane between the housing halves as being perpendicular to the axis of the main portion of the crankshaft, it is within the spirit of this invention to place the parting plane perpendicular to the axis of the rotor shaft. This arrangement may be preferred from the manufacturing standpoint in order to provide better rotor seating and to simplify the removal of the nutator from the lower housing without removal of the crankshaft.

Figures 9A, 9B:
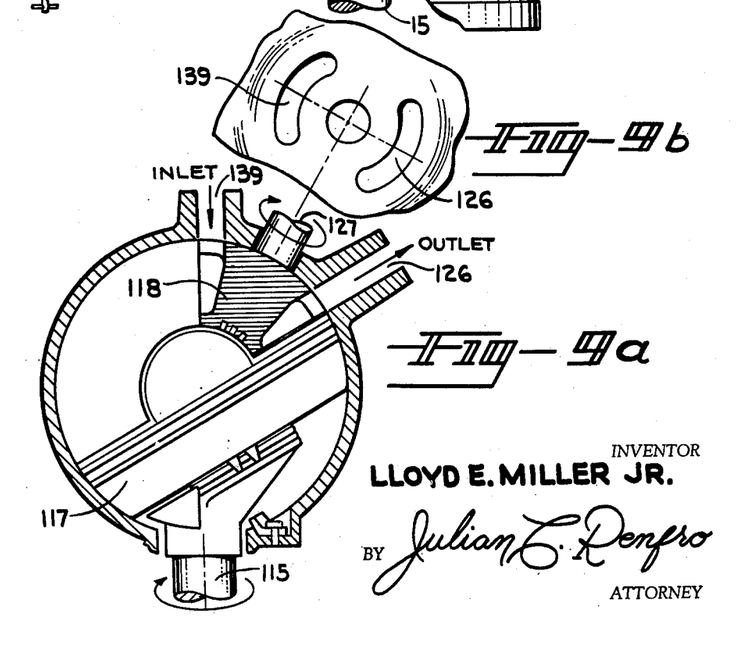
FIGURE 9a is a simplified view of a pump embodiment in accordance with this invention.
FIGURE 9b is a fragmentary view of a portion of the interior of the pump embodiment, revealing inlet and outlet port details.

As should be obvious, my invention is not limited to engine embodiments, for a pump in accordance with the basic concepts of this invention may be provided with but comparatively minor changes. Referring to FIGURE 9a, it will be noted that nutator 117 and rotor 118 are utilized as in the engine embodiment of FIGURE 1, for example, but with the inlet and outlet ports rearranged so as to dispose inlet port 139 in approximately the locations of the exhaust port in the engine embodiments, and outlet port 126 in approximately the location previously occupied by spark plug hole 62. However, as shown in FIGURE 9b, the inlet and outlet ports are desirably kidney shaped.

As should be apparent, upon the application of power either to nutator shaft 115 or rotor shaft 127, the interconnected nutator and rotor will be caused to operate relatedly in the previously explained manner so as to cause fluid to be drawn in through Inlet 139, and after being substantially increased in pressure, delivered out through Outlet 126.

Other embodiments and devices within the spirit of my invention will be apparent to those skilled in the art, and I am not to be limited to the embodiments illustrated and described herein except as required by the scope of the appended claims.

In conclusion, the present invention offers significant advantages over prior art rotary engines, particularly those using line-contact sealing and those limited to relatively small volumetric displacement. Because my engine advantageously employs area-type sealing, leakage and wear are reduced to a minimum while a low surface-to-volume ratio, inherently present, effects a high net horsepower output due to lessened frictional losses.

I claim:
1. In combination, a generally spherical housing, an interconnected rotor and nutator rotatively disposed in said housing and each having thereon a pair of working surfaces, opposed working surfaces on said rotor and nutator defining with an internal spherical portion of said housing a pair of chambers whose volumes change substantially and in opposite phase during rotation of rotor and nutator with respect to said housing, said nutator undergoing nutative motion during its rotation, with its working surfaces alternately moving toward and away from the respective working surfaces of the rotor, thereby to bring about said volume changes, said nutator being provided with a load-bearing surface disposed about its periphery, a first substantially circular track disposed about a portion of the interior of said housing, with which said load-bearing surface is in continuous contact during rotation of said nutator, an upstanding member substantially centrally disposed with respect to said first track, a second track disposed about the upper surface of said upstanding member, a track-contacting member disposed on a side of said nutator remote from the working surface of said nutator, latter said member being in contact with said second track during rotation of said nutator, said tracks together providing proper nutational motion at all rotative positions of said nutator, and restraining means for preventing, during a phase of rotation of said interconnected rotor and nutator when such members are in alignment, the unrestrained rotation of latter said members without volumetric change in said chambers.

2. A rotary displacement device of the class described comprising a generally spherical housing, said housing having inlet and outlet means, an interconnected rotor and nutator rotatively disposed in said housing and having working surfaces thereon, opposed working surfaces on rotor and nutator defining with an internal spherical portion of said housing a pair of chambers whose volumes change in opposite phase during rotation of rotor and nutator with respect to said housing, said nutator undergoing nutative motion in said housing during rotation, thereby to bring about substantial volume changes in said chambers, the axis about which said nutator nutates being in alignment with the axis of rotation of said rotor only during certain rotative positions of these members, means providing access from said inlet means to said chambers during a portion of the nutator rotation, means for admitting fluid from said inlet means into said chambers during said access, to be compressed by subsequent movement of the working surfaces of said nutator toward respective working surfaces of said rotor, said outlet means subsequently providing egress of fluid from said chambers, and restraining means for preventing, during alignment of said axis of nutation and said axis of rotation of said rotor, undrestrained rotation of said members without volumetric change in said chambers.

3. The rotary displacement device as defined in claim 2 utilizing with said rotor and nutator, a center bar forming the interconnection between said members and being integral with one of said members, sealing means disposed on the other of said members and biased into close contact with the said center bar to prevent the leakage of high pressure fluid between said members, additional sealing means disposed at each end of said center bar to further prevent leakage, said nutator having a skirt extending about its periphery in sliding yet gas tight contact with said internal spherical portion of said housing, and sealing means extending about said skirt of said nutator and biased into contact with said inner portion of said housing by spring means.

4. The device as defined in claim 2 in which said device is an engine having means for supplying fuel to said chambers to be combusted therein, the combustion causing the release of power in said chambers, thereby driving the working surfaces of said nutator sequentially away from the working surfaces of said rotor, and means for translating the motion of said nutator into useful power.

5. The device as defined in claim 4 in which said means for supplying fuel is a fuel injection nozzle for injecting fuel directly into the combustion chamber.

6. The device as defined in claim 2 in which said device is a pump for substantially changing the pressure of fluid inserted into its inlet.

7. A rotary internal combustion engine comprising a housing, said housing having a wall defining a generally spherical cavity, a pair of rotatable members closely fitted in said cavity and interconnected so as to rotate together, one of said members being a nutator arranged to nutate during rotation, the axis about which said nutator nutates being in alignment with the axis of rotation of the other member only during certain rotative positions of said members, each of said members having thereon a pair of working surfaces, opposed working surfaces on said members defining in said cavity a pair of combustion chambers whose volumes change substantially and in opposite phase during rotation of said members in said housing, said volume changes occurring as a result of the working surfaces of said one member alternately approaching and then moving away from the working surfaces of the other of said members as said members rotate in said housing, scavenging means including means for sequentially admitting scavenging air and fuel into said combustion chambers to be combusted therein, said charges being alternately compressed as a result of said working surfaces of said one member alternately moving toward the working surfaces of said other member, the working surfaces of said one member being alternately driven away from said other member by the combustion of said charges taking place in said combustion chambers, and rotary means driven by said one member for delivering useful rotative power, and restraining means for preventing, during alignment of said axis of nutation and the axis of rotation of said other member, undestrained rotation of said members without volumetric change in said chambers.

8. The engine as defined in claim 7 in which said one member is mounted upon a crankshaft whose axis of rotation is disposed at an angle to the axis of rotation of said other member thus defining a relationship responsible for bringing about the nutation of said one member, said crankshaft forming the power takeoff means for said engine.

9. The engine as defined in claim 7 in which said one member is nutatively disposed about a fixed upright member located in said spherical cavity at a point remote from said other member, said upright member defining an axis about which said one member can rotate as well as nutate, said axis being disposed at an angle to the axis of rotation of said other member, said other member forming the power takeoff means for said engine.

10. The engine as defined in claim 7 in which a fuel injector is employed for injecting fuel into said combustion chamber.

11. A rotary internal combustion engine utilizing no oscillatory parts comprising a housing, said housing having a wall defining a generally spherical cavity, a pair of rotatable members disposed in substantially opposite portions of said housing, each of said members having a spherical portion in close contact with said spherically-shaped wall, and each having two working surfaces, one of said members being a nutator rotatably mounted upon the crankpin of a crankshaft, said crankshaft being rotatably disposed in said wall, the other of said members being a rotor hinged to said nutator and having an axis of rotation disposed considerably more than 90° away from the crankshaft axis, but less than 180° away therefrom, said crankpin being disposed at an angle to the axis of said crankshaft equal to the acute angle the axis of rotation of said rotor bears to the extended crankshaft axis, whereby as said crankshaft rotates, the angularity of said crankpin with respect to the axis of said crankshaft causes the nutator to understake nutative motion during rotation with said rotor, the working surfaces of said nutator being caused to move in opposite phase alternately toward and away from the respective working surfaces of said rotor during such rotation, the oppositely disposed working surfaces of said members defining with said wall of said housing a pair of combustion chambers whose volumes change appreciably and in opposite phase as said working surfaces move in rotation about said housing, scavenging means, including means for sequentially admitting scavenging air and fuel into said combustion chambers to be combusted therein, said charges being compressed as a result of the working surfaces of said nutator alternately moving toward the working surfaces of said rotor, the working surfaces of said nutator being successively driven away from said rotor by the combustion of said charges, thereby to supply useful power at said crankshaft, and restraint means for restraining said rotatable members against undesirable rotative movement in said housing during the interval in which the axis of said crankpin is in substantial alignment with the axis of said rotor, said restraint means comprising at least one tooth disposed on opposite edges of said nutator, said teeth being in substantial alignment with the axis of the hinge interconnection between said rotatable members, fixed means in said housing alternately engaged by said teeth during engine rotation, said fixed means being engaged from a period just before alignment of crankpin and rotor axis, until a period just after such alignment point has passed.

12. The engine as defined in claim 11 in which said pair of rotatable members are hinged together by a center bar integral with one of said members, the other of said members having an elongated cavity thereon closely configured to said center bar, and elongated sealing members disposed in said elongated cavity and arranged to bear against said center bar for assuring a pressure-tight relationship during relative motion between said rotatable members.

13. The rotary internal combustion engine as defined in claim 11 in which the axis of rotation of said rotor is defined by a rotor shaft, with which said rotor is integral, said rotor shaft being rotatably mounted in said wall of said housing, bearing means interposed between said rotor shaft and said wall, said bearing means maintaining a slight spacing of said spherical portion of said rotor away from said sperically-shaped wall, thereby decreasing friction encountered by said rotor with respect to said housing.

14. A rotary internal combustion engine comprising a housing, said housing having a wall defining a generally spherical cavity in said housing, a crankshaft rotatably mounted in said housing, the axis of said crankshaft if extended passing through the center of said spherical cavity, said crankshaft having a crankpin thereon bearing an acute angle to said crankshaft, the axis of said crankpin passing through said center of said cavity, a nutator rotatably disposed in gas-tight contact with the wall of said cavity and mounted upon said crankpin, being caused to nutate with respect to said housing as said crankshaft rotates, due to the angularity imposed by said crankpin, a rotor rotatably mounted in gas-tight contact in a substantially opposite portion of said housing from said crankshaft and having an axis that if extended would pass through said center of said cavity at an obtuse angle with respect to the axis of said crankshaft, a hinge connecting said nutator and said rotor for causing concomitant rotation of said nutator and rotor, said nutator and rotor having two working surfaces thereon, the working surfaces of said nutator being caused to move alternately toward and away from the respective working surfaces of said rotor during rotation, due to the nutating movement of said nutator, said working surfaces defining with said wall of said housing a pair of combustion chambers whose volumes change appreciably during each complete rotation of said nutator and said rotor in said housing, an inlet port controlled by said nutator for admitting scavenging air and fuel into said combustion chamber, the working surfaces of said nutator alternatively moving toward said working surfaces of said rotor, thus causing the charges to be compressed prior to combustion, and after combustion, said nutator in each instance being driven in the receding direction, thereby to supply power to said crankshaft, outlet means controlled by said rotor through which products of combustion are expelled, and restraining means for preventing, during a phase of rotation of said rotor and nutator when latter members are in alignment, the unrestrained rotation of said members without volumetric change in said chambers.

15. The engine as defined in claim 14 in which combustion of the combustible mixture in the combustion chamber is caused by a spark plug.

16. The engine as defined in claim 14 in which said engine incorporates a fuel injector, said engine operating on the diesel cycle, and ignition occurs due to the substantial temperature occasioned by high compression.

17. The engine as defined in claim 16 in which an electrical ignition device located adjacent said injector is used to augment the ignition of the combustible mixture.

18. The engine as defined in claim 14 in which said inlet and said outlet are on substantially opposite sides of said cavity, and scavenging means connected to said inlet, arranged to purge said chamber of exhaust products.

19. A rotary internal combustion engine comprising a generally spherical housing, said housing having a wall defining a generally spherical cavity in said housing, a separately mounted rotor and nutator closely fitted in said cavity, centrally disposed hinge means interconnecting said rotor and nutator for simultaneous rotation in said cavity, said nutator undergoing nutative motion during said rotation, the axis about which said nutator nutates being in alignment with the axis of rotation of said rotor only during certain rotative positions of these members, said rotor and nutator defining with respect to said hinge means at least one pair of opposed working surfaces which define with a portion of said cavity wall at least one combustion chamber whose volume changes substantially during the rotation of rotor and nutator as a result of the nutative motion of said nutator, said nutator having a circumferential skirt, the full extent of which is disposed at all times in sliding contact with said cavity wall, inlet and outlet means for said combustion chamber through which a combustible mixture and exhaust products, respectively, may flow, and means for igniting said mixture approximately when said combustion chamber volume is smallest, thereby to bring about combustion in said combustion chamber and consequent development of power, and restraining means for preventing, during alignment of said axis of nutation and said axis of rotation of said rotor, unrestrained rotation of said members without volumetric change in said chambers.

20. The engine as defined in claim 19 in which said rotor and nutator each have a pair of working surfaces, with opposed working surfaces on said rotor and nutator defining a combustion chamber on each side of said hinge means, the volumes of said combustion chambers changing in opposite phase during operation of said engine, and consequently delivering power alternately.

21. The engine as defined in claim 19 in which said nutator has a working surface on one side of said hinge means, and an apertured surface on the other side of said hinge means, a crankcase defined in said cavity on the remote side of said nutator, with respect to said rotor is mounted upon a shaft rotatably mounted in said as said nutator undertakes nutative movements in said cavity, said inlet means being connected to deliver combustible mixture to said crankcase prior to its entering said combustion chamber, conduit means disposed between said crankcase and said combustion chamber, said conduit being opened when said nutator is in the position defining substantially maximum combustion chamber volume, said crankcase serving to precompress the combustible mixture as a result of nutator movement, said mixture, when allowed by said nutator to flow into said combustion chamber, then bringing about a self-scavenging of said combustion chamber.

22. The engine as defined in claim 21 in which said nutator is rotatably mounted upon the crankpin of a crankshaft which is rotatively disposed in said housing, and said rotor is mounted on a rotor shaft also rotatively mounted in said housing, said crankpin and rotor shaft each being disposed at an acute angle with respect to the principal axis of said crankshaft, said crankshaft delivering the useful output of said engine.

23. The engine as defined in claim 21 in which said rotor is mounted upon a shaft rotatably mounted in said housing, and a stationary upright member in said housing is responsible for the nutative motion of said nutator as it rotates in said cavity, said rotor shaft delivering the useful output of said engine.

24. In combination a generally spherical housing, an interconnected rotor and nutator rotatively disposed in said housing and each having thereon a pair of working surfaces, opposed working surfaces on said rotor and nutator defining with an internal spherical portion of said housing a pair of chambers whose volumes change substantially and in opposite phase during rotation of rotor and nutator with respect to said housing, said nutator undergoing nutative motion during its rotation, with its working surfaces alternately moving toward and away from the respective working surfaces of the rotor, thereby to bring about said volume changes, said nutator being rotatively mounted upon the angled crankpin of a crankshaft mounted in said housing, with the axis of rotation of said crankshaft offset from alignment with the axis of rotation of said rotor, the axis of said crankpin being in alignment with the axis of rotation of said rotor only during certain rotative positions of said crankshaft, and restraining means for preventing, during said alignment of latter axes, unrestrained rotation of said nutator upon said crankpin without volumetric change in said chambers.

References Cited by the Examiner

UNITED STATES PATENTS

| | | |
|---|---|---|
| 2,503,159 | 4/50 | Lane. |
| 2,608,960 | 9/52 | Kunz. |
| 2,812,748 | 11/57 | Simonian. |
| 2,949,897 | 8/60 | Raybon. |
| 2,969,049 | 1/61 | Dillenberg. |

FOREIGN PATENTS

| | | |
|---|---|---|
| 102,180 | 4/99 | Germany. |
| 321,935 | 10/34 | Italy. |

JOSEPH H. BRANSON, JR., *Primary Examiner.*

KARL J. ALBRECHT, FRED E. ENGELTHALER,
*Examiners.*